United States Patent

Suga

[11] Patent Number: 6,115,483
[45] Date of Patent: Sep. 5, 2000

[54] FINGERPRINT DETECTING DEVICE AND METHOD

[75] Inventor: Michihisa Suga, Tokyo, Japan

[73] Assignee: NEC Corporation, Tokyo, Japan

[21] Appl. No.: 09/048,043

[22] Filed: Mar. 26, 1998

[30] Foreign Application Priority Data

Mar. 27, 1997 [JP] Japan ................................ 9-075368

[51] Int. Cl.⁷ .................................................. G06K 9/24
[52] U.S. Cl. ............................................ 382/127; 356/71
[58] Field of Search ..................................... 382/124, 125, 382/126, 127, 312, 315; 356/71, 135, 136; 340/825.34; 385/36

[56] References Cited

U.S. PATENT DOCUMENTS

| | | | |
|---|---|---|---|
| 4,322,163 | 3/1982 | Schiller | 356/71 |
| 4,428,670 | 1/1984 | Ruell et al. | 356/71 |
| 4,556,320 | 12/1985 | Kranz et al. | 356/350 |
| 4,832,485 | 5/1989 | Bowles | 356/71 |
| 4,995,086 | 2/1991 | Lilley et al. | 382/4 |
| 5,096,290 | 3/1992 | Ohta | 356/71 |
| 5,177,353 | 1/1993 | Schiller | 250/227.11 |
| 5,736,734 | 4/1998 | Marcus et al. | 250/225 |

FOREIGN PATENT DOCUMENTS

| | | | |
|---|---|---|---|
| 0 194 783 A2 | 9/1986 | European Pat. Off. . | |
| 0 514 182 A1 | 11/1992 | European Pat. Off. | A61B 5/117 |
| 2-170291 | 7/1990 | Japan . | |
| 6-195450 | 7/1994 | Japan . | |
| 7-98754 | 4/1995 | Japan | G06T 1/00 |
| 9-167224 | 6/1997 | Japan . | |
| 10-269342 | 10/1998 | Japan . | |

OTHER PUBLICATIONS

Paul A. Tipler, Physics, Worth Publishers, Inc, ISBN 0–87901–135–1, pp. 856–861, 1982.

Primary Examiner—Leo H. Boudreau
Assistant Examiner—Brian P. Werner
Attorney, Agent, or Firm—Foley & Lardner

[57] ABSTRACT

In a fingerprint detecting device, the skin surface of a finger is pressed against a transparent body. A light source irradiates incident light from an inside of the transparent body on the skin surface. A thin surface film layer is formed on the surface of the transparent body, on which a three-dimensional pattern of the skin surface is transferred by pressing the finger, to pass the incident light from the light source an area where the surface film layer contacts the surface of the transparent body. A fluid layer is formed by sealing one of a gas and a liquid between the surface of the transparent body and the surface film layer. The fluid layer is pressed by the surface film layer on which the three-dimensional pattern of the skin surface is transferred and totally reflects the incident light from the light source in an area where the fluid layer contacts the surface of the transparent body. An image detection unit detects an image fingerprint pattern on the basis of the light from the light source, which is reflected by the surface of the transparent body, when the surface film layer comes into contact with the surface of the transparent body in accordance with the three-dimensional pattern of the skin surface. A method for this device is also disclosed.

10 Claims, 3 Drawing Sheets

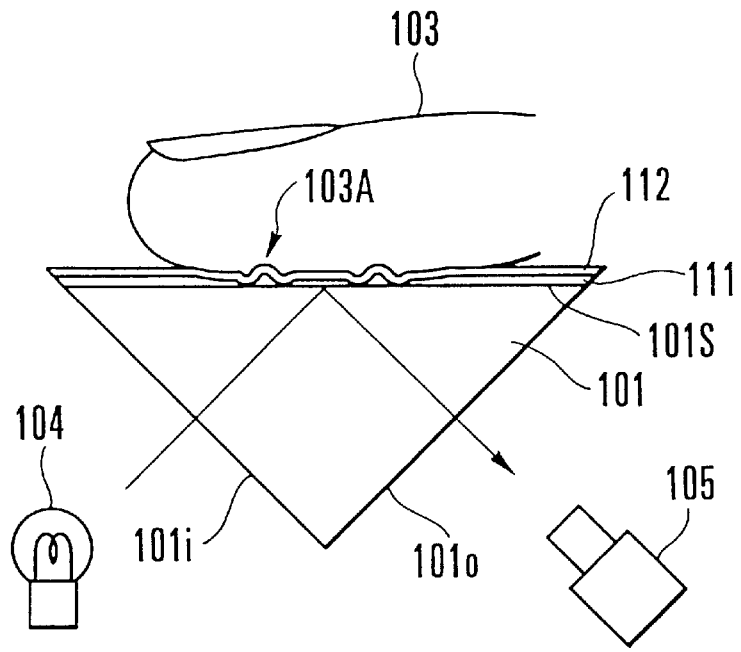
F I G. 1
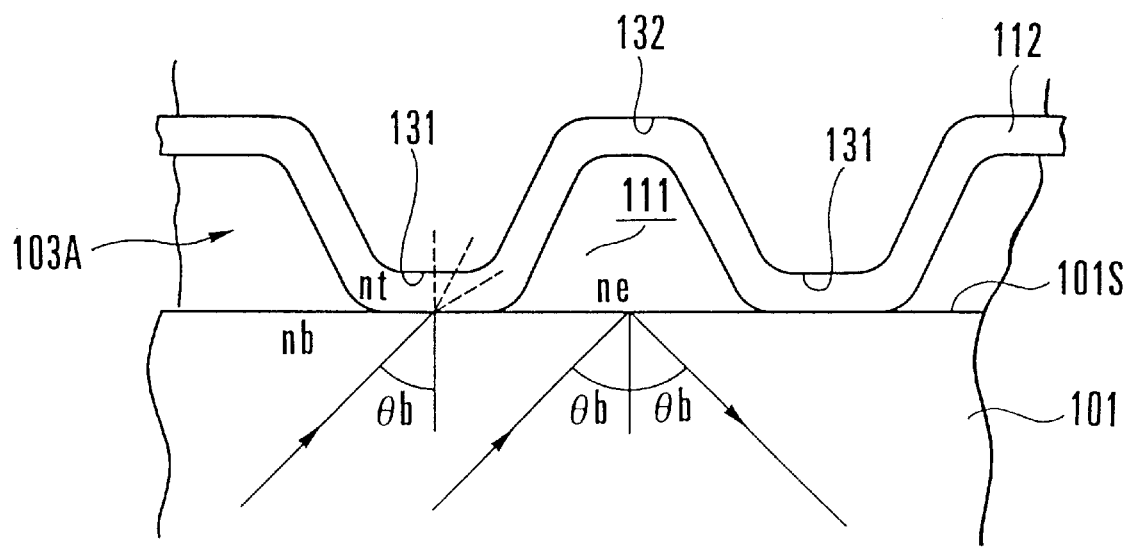
F I G. 2

FINGERPRINT DETECTING DEVICE AND METHOD

BACKGROUND OF THE INVENTION

The present invention relates to a fingerprint detecting device and method and, more particularly, to a fingerprint detecting device and method of irradiating light inside a fingertip through a transparent body and detecting a fingerprint pattern from reflected light.

Generally, a fingerprint detecting device for irradiating light inside a fingertip pressed against a transparent body and detecting a fingerprint pattern of the fingertip from reflected light uses optical characteristics, as shown in FIG. 4.

FIG. 4 explains the behavior of light on the boundary surface of a transparent body. Reference numeral 1 denotes a transparent body such as an optical glass member; 1S, a surface of the transparent body 1; and 8, air. In this arrangement, light which is incident from a lower portion g of the transparent body 1 on a point b of the surface 1S at an incident angle $\theta b$ with respect to a vertical axis jk (jk represents a line passing points j and k) of the surface 1S of the transparent body 1 emerges into the air 8 in a direction c at a refraction angle $\theta a$ with respect to the vertical axis jk.

Letting nb and na be the refractive indices of the transparent body 1 and the air 8, respectively, the relationship between the incident angle $\theta b$ and the refraction angle $\theta a$ is given by $$na \cdot \sin\theta a = nb \cdot \sin\theta b$$

on the basis of the Snell's law.

Normally, the refractive index na of the air 8 is lower than the refractive index nb of the transparent body 1 such as an optical glass member (na<nb), so the refraction angle $\theta a$ becomes larger than the incident angle $\theta b$ ($\theta a > \theta b$).

When the incident angle $\theta b$ is selected to satisfy $\sin\theta a > na/nb$, no refraction angle $\theta a$ can satisfy the Snell's law. The incident light is totally reflected by the surface 1S of the transparent body 1.

The incident light for causing the total reflection, i.e., a critical angle $\theta c$ is given by $$\theta c = \sin^{-1}(na/nb)$$

In FIG. 4, assume that $\angle gbk = \theta c (=\angle hbk)$, light incident from the angle region represented by gbf (hbi) is totally reflected to the transparent body 1 side along the optical path dbe (ebd). On the other hand, light incident from the angle region gbh emerges into the air 8 along the optical path abc in accordance with the Snell's law. This also applies to light incident from the air 8 side, so light emerging to the absorbed or irregularly reflected by the finger 3. Therefore, the image detection unit 5 detects the fingerprint pattern of the skin surface 3A, which has bright valley portions and dark ridge portions.

However, in such a conventional fingerprint detecting device, the detected fingerprint pattern largely changes due to a gap between the surface 1S of the transparent body 1 and the finger due to a fine three-dimensional pattern present on the ridge portions of the finger 3 or the condition (dry state or wet state due to sweat) of the finger 3, so a predetermined satisfactory fingerprint pattern cannot always be obtained.

FIGS. 6A and 6B show the contact states of the finger on the surface 1S of the transparent body 1 shown in FIG. 5. As shown in FIG. 6A, when the finger 3 is dry, a small gap 35 is formed between a ridge portion 31 of the skin surface 3A and the surface 1S of the transparent body 1 because of the fine three-dimensional pattern on the ridge portion 31. Since air is present in the gap 35, light is totally reflected even at the ridge portions 31.

On the other hand, as shown in FIG. 6B, when the finger 3 is wet due to sweat or the like, sweat or grease 36 is adhered between the ridge portions 31 of the skin surface 3A and the surface 1S of the transparent body 1. Light is absorbed by a portion wider than the initial ridge portion 31, so the light to be totally reflected at a valley portion 32 decreases.

In a certain condition of the finger 3 and, more particularly, in the dry state, the fingerprint pattern is partially omitted and disconnected. In the wet state, the ridge portions 31 and the valley portions 32 of the skin surface 3A are not clearly discriminated. For this reason, a satisfactory fingerprint pattern cannot always be obtained.

A fingerprint detecting device in which a transparent elastic member is tightly mounted on a transparent body via a coupling agent, as disclosed in Japanese Patent Laid-Open No. 7-98754, or an elastic film is formed on a transparent body to bring the three-dimensional pattern of the skin surface into tight contact with the optical reference surface (fingerprint image input surface), as disclosed in Japanese Patent Laid-Open No. 6-195450, has been proposed.

However, in these arrangements, the surface where the three-dimensional pattern of the skin surface contacts the transparent elastic optical member is defined as the optical reference surface. For this reason, when the finger is wet, and sweat is present not only at the ridge portions of the skin surface but also in gaps between the valley portions and the transparent elastic optical member, incident light is absorbed even at the valley portions due to the sweat. This makes it difficult to discriminate the valley portions from the ridge portions, so a satisfactory fingerprint pattern can hardly be obtained.

SUMMARY OF THE INVENTION

It is an object of the present invention to provide a fingerprint detecting device and method capable of always obtaining a satisfactory fingerprint pattern independently of the finger condition.

In order to achieve the above object, according to the present invention, there is provided a fingerprint detecting device comprising a transparent body on which a skin surface of a finger is pressed, a light source for irradiating incident light from an inside of the transparent body on the skin surface pressed against a surface of the transparent body, a thin surface film layer formed on the surface of the transparent body, on which a three-dimensional pattern of the skin surface is transferred by pressing the finger, the surface film layer passing the incident light from the light source in an area where the surface film layer contacts the surface of the transparent body, a fluid layer formed by sealing one of a gas and a liquid between the surface of the transparent body and the surface film layer, the fluid layer being pressed by the surface film layer on which the three-dimensional pattern of the skin surface is transferred, and totally reflecting the incident light from the light source in transparent body 1 side emerges only to the angle region gbh.

A conventional fingerprint detecting device shown in FIG. 5 uses such optical characteristics and irradiates light on the skin surface with ridge/valley portions at a predetermined incident angle to cause total reflection from the transparent body 1 side. In FIG. 5, reference numeral 3 denotes a finger placed on a surface 1S of a triangular-prism-shaped transparent body 1 and having a skin surface 3A; 4, a light source; and 5, an image detection unit. Light from the light source 4 is irradiated on the skin surface 3A through the transparent body 1, and the reflected light is detected by the image detection unit 5.

Normally, the refractive index of the ridge portion (projecting portion) of the skin surface 3A is higher than the refractive index na of air and close to the refractive index nb of the transparent body such as an optical glass member. For this reason, total reflection of light occurs only on the surface 1S of the transparent body 1 contacting the valley portions (recessed portions) of the skin surface 3A, where air is present. On the other hand, the total reflection of light does not take place at the ridge portions of the skin surface 3A having a refractive index close to the refractive index nb of the transparent body 1, so the light transmitted through the transparent body is an area where the fluid layer contacts the surface of the transparent body, and image detection means for detecting an image fingerprint pattern on the basis of the light from the light source, which is reflected by the surface of the transparent body, when the surface film layer comes into contact with the surface of the transparent body in accordance with the three-dimensional pattern of the skin surface.

BRIEF DESCRIPTION OF THE DRAWINGS

FIG. 1 is a schematic view of a fingerprint detecting device according to an embodiment of the present invention;

FIG. 2 is an enlarged view showing the main part of FIG. 1 so as to explain the behavior of light on the body surface;

DESCRIPTION OF THE PREFERRED EMBODIMENT

Figure 3:
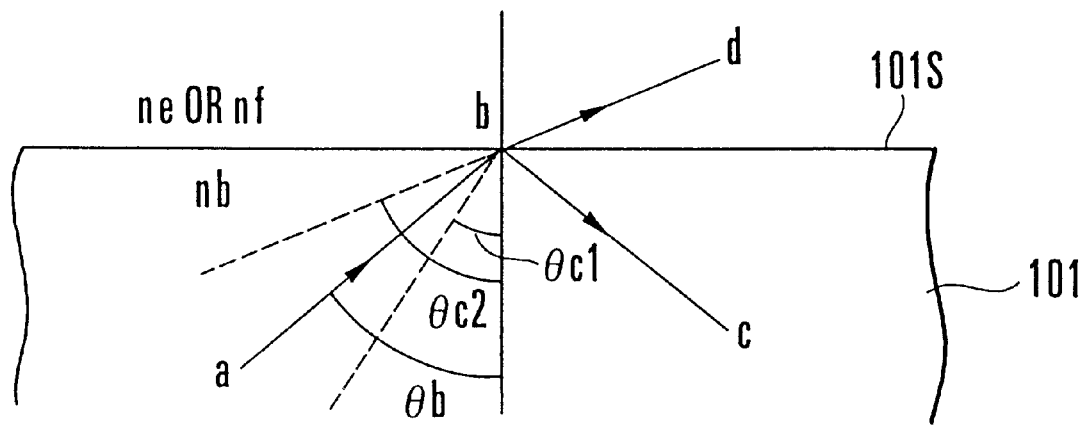
FIG. 3 is a view for explaining the behavior of light at the boundary between a transparent body and air.
Figure 4:
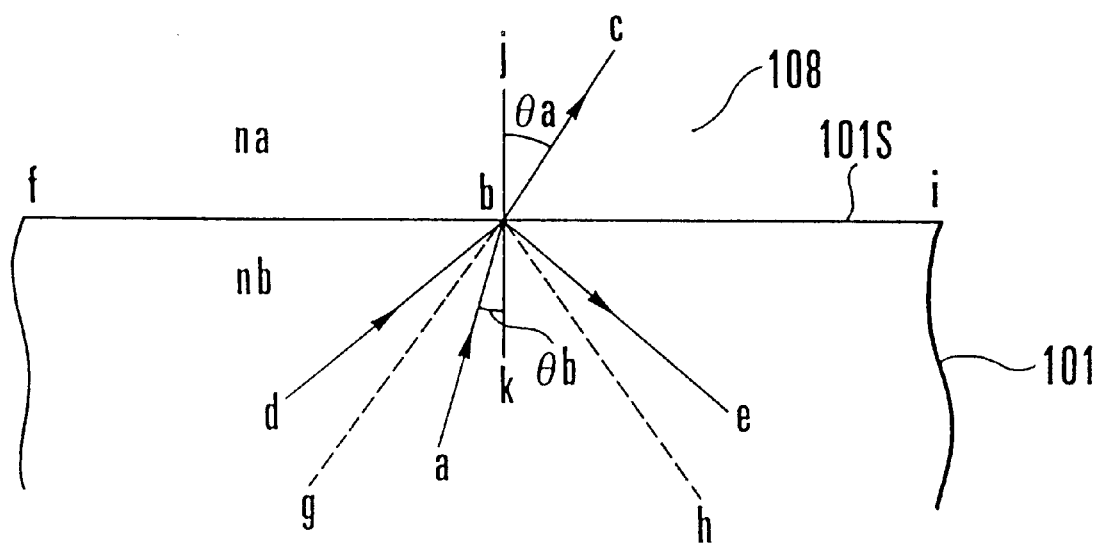
FIG. 4 is a view for explaining the relationship between an incident angle and a critical angle.

The present invention will be described below in detail with reference to the accompanying drawings.

FIG. 1 shows a fingerprint detecting device according to an embodiment of the present invention. Referring to FIG. 1, reference numeral 101 denotes a transparent body consisting of an optical glass triangular prism; 103A, a skin surface of a finger 103; and 105, an image detection unit for detecting, as an image, a fingerprint pattern obtained through the transparent body 101.

A thin surface film layer 112 is formed on a surface 101S of the transparent body 101 via a small gap. A fluid layer 111 is formed between the surface 101S of the transparent body 101 and the surface film layer 112 by sealing a fluid such as a gas or a liquid.

In this arrangement, when the finger 103 is pressed against the surface 101S of the transparent body 101, a three-dimensional pattern formed from the ridge portions (projecting portions) and valley portions (recessed portions) of the skin surface 103A is transferred to the surface film layer 112. The surface film layer 112 on which the three-dimensional pattern is transferred is pressed against the fluid layer 111 at portions corresponding to the ridge portions of the skin surface 103A and contacts the surface 101S of the transparent body 101. The difference in behavior of light (scattering or absorption) between an area where the surface film layer 112 contacts the surface 101S of the transparent body 101 and an area where the surface film layer 112 does not contact the transparent body surface 101S is detected by the image detection unit 105 as an image fingerprint pattern.

FIG. 2 shows the main part of FIG. 1. The behavior of light incident from the light source 104 on the transparent body 101 will be described with reference to FIG. 2.

When the finger 103 is pressed against the surface film layer 112, the surface film layer 112 contacts the surface 101S of the transparent body 101 in the area of a ridge portion 131 of the skin surface 103A. On the other hand, in the area of a valley portion of the skin surface 103A, the fluid in the fluid layer 111 remains in the recessed portion, so the surface film layer 112 does not contact the surface 101S of the transparent body 101. The surface film layer 112 is deflected and deforms in accordance with the three-dimensional pattern of the skin surface 103A, so the surface film layer 112 contacts the surface 101S of the transparent body 101 only in the area of the ridge portion 131.

The light incident from the light source 104 on the transparent body 101 is irradiated on the surface 101S of the transparent body 101 at a predetermined incident angle. The refractive indices of the respective materials of the surface film layer 112, the fluid layer 111, and the transparent body 101 satisfy a predetermined magnitude relationship. The optimum shape of the triangular prism constituting the transparent body 101 is determined on the basis of the refractive index values of the materials.

FIG. 3 is an explanatory view showing the relationship between the incident angle and a critical angle. Let nf, ne, and nb be the refractive indices of surface film layer 112, the fluid layer 111, and the transparent body 101, respectively. Additionally, let θb be the incident angle θb of light incident on the body surface 101S, θc2 be the critical angle on the boundary surface where the transparent body 101 contacts surface film layer 112, and θc1 be the critical angle on the boundary surface where the transparent body 101 contacts the fluid layer 111.

Light at the incident angle θb is totally reflected by the valley portion 132, i.e., the boundary surface between the transparent body 101 and the fluid layer 111 along the optical path abc and transmitted (absorbed) by the ridge portion 131, i.e., the boundary surface between the transparent body 101 and the surface film layer 112 along the optical path abd under conditions:

θc2>θb, and θb>θc1

Since θb>θc1, the relationship in refractive index between the fluid layer 111 and the transparent body 101 must be ne<nb The refractive index nf of the surface film layer 112 is preferably higher than the refractive index nb of the transparent body 101. This is because, in the area where the surface film layer 112 contacts the surface 101S of the transparent body 101, incident light is always absorbed, so total reflection does not occur.

However, since the surface film layer 112 generally consists of an organic material, the refractive index selection range is narrow, and it is difficult to make the refractive index nf of the surface film layer 112 higher than the refractive index nb of the transparent body 101.

If the refractive index nf of the surface film layer 112 is not higher than the refractive index nb, the incident angle θb of incident light may be limited to be smaller than the critical angle θc2, and the materials for the surface film layer 112 and the transparent body 101 may be selected such that the difference between the refractive indices nf and nb becomes as small as possible.

Under this condition, an incident surface 101*i* and an exit surface 101*o* of the transparent body 101 shown in FIG. 1 are preferably perpendicular to the incident light at the incident angle θb and the exit light at the exit angle θb, respectively. Therefore, the triangular-prism-shaped transparent body 101 has an isosceles triangular section although the vertex angle is not always a right angle.

The refractive indices and incident angle are set as described above. Since the fluid layer 111 contacts the surface 101S of the transparent body 101 in the area of the valley portion 132, total reflection takes place in this area because of the relationship between the refractive indices ne and nb and the incident angle θb. On the other hand, in the area of the ridge portion 131, the surface film layer 112 contacts the transparent body surface 101S. For this reason, the light is absorbed or irregularly reflected by the ridge portion 131 of the finger 103 because of the relationship between the refractive indices nf and nb and the incident angle θb. The image detection unit 105 obtains an image fingerprint pattern having dark ridge portions 131 and bright valley portions 132.

Selection examples of materials for satisfying the refractive index conditions will be described next.

As the material of the surface film layer 112, a plastic film of polyethylene, polypropylene, polyethylene terephthalate, or the like is suitable. The refractive indices of these plastic materials fall within the range of about 1.5 to 1.7. The surface film layer 112 is preferably formed as thin as possible to be fitted to the three-dimensional pattern of the skin surface 103A. However, to ensure the mechanical strength, a certain thickness is required.

Therefore, the thickness of the surface film layer 112 is preferably selected in the range of about 5 to 50 μm and, more preferably, about 10 to 30 μm. For example, a polyethylene terephthalate film having a thickness of about 10 μm is easily accessible and also has a sufficient mechanical strength. The refractive index of this film is 1.65.

In the fluid layer 111, when the finger 103 is pressed against the transparent body 101, the fluid pressed by the ridge portion 131 of the skin surface 103A flows to the peripheral portion or the valley portion 132 of the skin surface with a lower pressure. When the fluid flows through a small gap, a fluid resistance is generated by the viscosity of the fluid. This fluid resistance is an important factor for increasing the internal pressure of the fluid and applying an isotropic pressure to the surface film layer 112 to fit the surface film layer 112 to the three-dimensional pattern of the skin surface 103A.

Since the depth of the three-dimensional pattern of the skin surface 103A is about 50 μm, a thickness of 50 μm suffices for the fluid layer 111. However, when the finger 103 is pressed against the transparent body, an excess fluid is pressed and moves to the peripheral portion, so no problem is posed in the thickness of the fluid layer 111 of 50 μm or more. Even when the fluid layer 111 has a thickness smaller than 50 μm, the surface film layer 112 is satisfactorily fitted at least to the ridge portion 131 of the skin surface 103A, so no problem is posed.

As shown in FIG. 2, when the finger 103 is pressed against the transparent body, the surface film layer 112 comes into tight contact with the transparent body 101 in the area of the ridge portion 131 of the skin surface 103A. On the other hand, in the area of the valley portion 132 of the skin surface 103A, the fluid constituting the fluid layer 111 is confined between the surface film layer 112 and the transparent body 101. At this time, the internal pressure of the fluid almost balances.

When the viscosity of the fluid is high, the fluid resistance increases, and a certain time is required to balance the internal pressure of the fluid. For this reason, a fluid having an excessively high viscosity is not suitable. A fluid having a kinematic viscosity of about 5,000 mm$^2$/s or less and, more preferably, about 1,000 mm$^2$/s or less at room temperature can be used without posing any problem. Most fluids have refractive indices of 1.3 to 1.5. According to the experiment conducted by the present inventor, water could be used as the fluid material. The kinematic viscosity of water was 1 mm$^2$/S, and the refractive index was 1.33.

However, since fungi or bacteria readily grow in water, stable optical characteristic can hardly be ensured for a long time. From this viewpoint, a colorless and transparent silicone oil can be used as a more preferable selection example of the fluid. The kinematic viscosity of the silicone oil was about 500 mm$^2$/s, and the refractive index was 1.38. The fluid is not limited to a liquid. Even when a gas such as air is used, the same effect as described above for a fluid can be obtained.

The transparent body 101 must have a higher refractive index than that of the fluid layer 111, as described above. Heavy thallium flint glass is well known as an optical glass material having a high refractive index, and its refractive index is 1.90. Heavy flint glass, lanthanum flint glass, and the like are also known, and these materials have a refractive index of 1.75.

When materials having refractive indices 1.65 and 1.38 are used as the surface film layer 112 and the fluid layer 111, respectively, and heavy flint glass having a refractive index of 1.90 is used as the transparent body 101, the critical angles are θc1=46.6°, and θc2=60.3°

The incident angle θb of irradiation light is set to be an intermediate value between these values. For example, when the incident angle is θb =50°, a prism whose isosceles triangular section has a vertex angle of 80° may be used.

Figure 5:
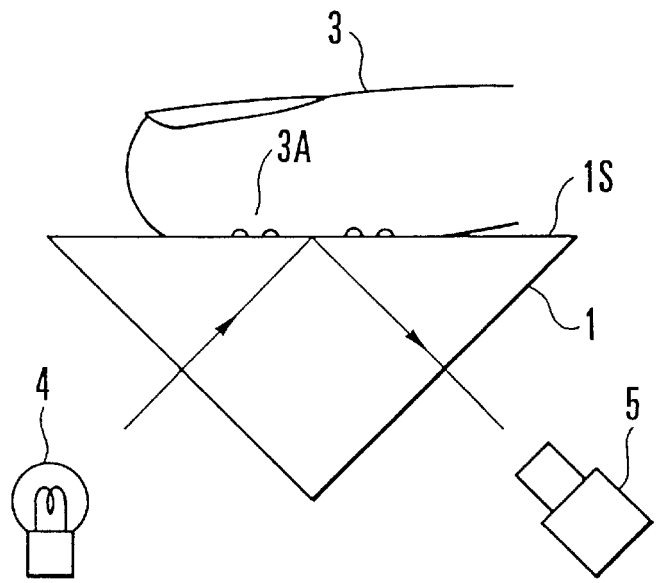
FIG. 5 is a schematic view of a conventional fingerprint detecting device.
Figure 6A:
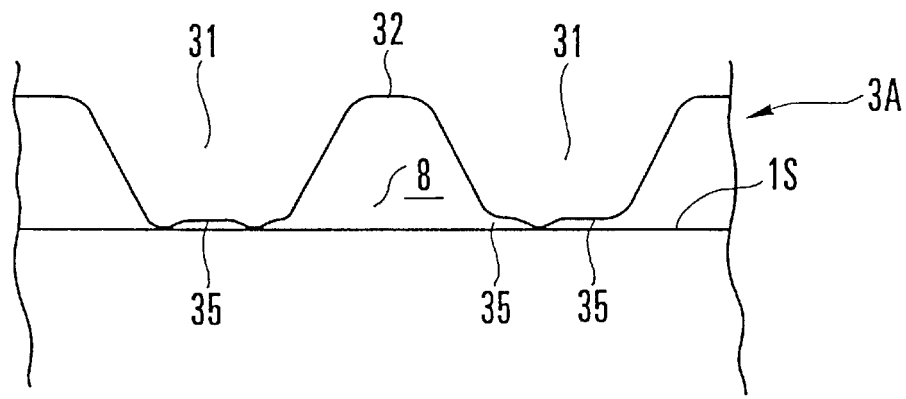
FIG. 6A is a view showing the contact state between a dry finger and the body surface.
Figure 6B:
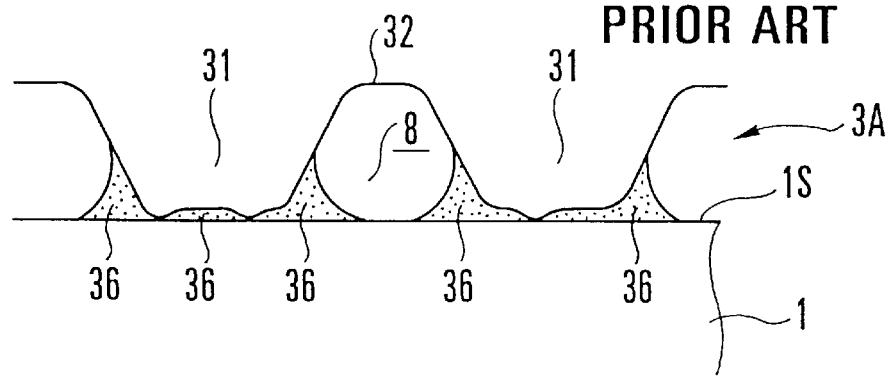
FIG. 6B is a view showing the contact state between a wet finger and the body surface.

An experiment conducted by the present inventor revealed that in the conventional fingerprint detecting device in which the finger 3 was directly pressed against the surface 1S of the transparent body 1, as shown in FIG. 5, when air was dry in winter, the ridge portion 31 of the fingerprint pattern 3A was not detected as a solid line, and only a broken fingerprint pattern was obtained in many cases. The reason for this is as follows. The ridge portion (projecting portion) of the skin surface 3A has sweat glands, so the ridge portion itself has a three-dimensional pattern because of the sweat glands.

Characteristics can hardly be extracted from the fingerprint pattern with the broken ridge portion 31 of the skin surface 3A by image processing. In individual identification for identifying an individual from a fingerprint pattern, the recognition ratio largely lowered to 80% or less, though, normally, a recognition ratio of about 95% or more is obtained.

In summer at a high temperature and humidity, sweat or grease 36 is always secreted from the sweat glands to fill the valley portions 32. For this reason, in the conventional fingerprint detecting device, adjacent ridge portions 31 are connected to make the fingerprint pattern vague. For individual identification using such a fingerprint pattern, the recognition ratio largely lowered to 70% or less.

In the present invention, even in winter under a dry condition or summer under a high temperature and humidity condition, the recognition ratio in individual identification does not lower and rather increases to 90% or more on the average. The reason for this is as follows. According to the present invention, the three-dimensional pattern of the skin surface 103A can be satisfactorily transferred to the surface film layer 112 and the fluid layer 111 independently of the dry or wet state of the finger 103.

In addition, by detecting the fingerprint pattern from the transferred pattern, a variation in optical detection condition due to an external factor such as adhesion of sweat, grease, or floating dust can be suppressed. As a result of this large improvement, the fingerprint detecting individual identification system which has been conventionally limited for use in a small group can be widely applied in various situations.

As has been described above, according to the present invention, the three-dimensional pattern of the skin surface is transferred to the surface film layer and the fluid layer and indirectly transferred to the surface of the transparent body. For this reason, even when sweat, grease, or dust is adhered on the fingerprint, or the finger is dry to make the fine three-dimensional pattern of the ridge portions of the skin surface conspicuous, a satisfactory fingerprint pattern can always be obtained.

In addition, since the incident angle of incident light is set to cause total reflection on the boundary surface between the transparent body and the fluid layer, and the light is transmitted through the boundary surface between the transparent body and the surface film layer, a clear fingerprint pattern can be obtained.

What is claimed is:

1. A fingerprint detecting device comprising:
   a transparent body on which a skin surface of a finger is pressed;
   a light source for irradiating incident light from an inside of said transparent body on the skin surface pressed against a surface of said transparent body;
   a thin surface film layer formed on said surface of said transparent body, on which a three-dimensional pattern of the skin surface is transferred by pressing the finger, said surface film layer passing the incident light from said light source in an area where said surface film layer contacts said surface of said transparent body;
   a fluid layer formed by sealing one of a gas and a liquid between said surface of said transparent body and said surface film layer, said fluid layer being pressed by said surface film layer on which said three-dimensional pattern of the skin surface is transferred, and totally reflecting the incident light from said light source in an area where said fluid layer contacts said surface of said transparent body; and
   image detection unit that detects an image fingerprint pattern on the basis of the light from said light source that is reflected by said surface of said transparent body.

2. A device according to claim 1, wherein
   said transparent body has a first refractive index,
   said surface film layer has a second refractive index,
   said fluid layer has a third refractive index lower than the first refractive index, and
   a change in reflected light due to reflection/absorption of the incident light from said light source, which takes place on said surface of said transparent body due to a difference between the first to third refractive indices is detected as an image pattern.

3. A device according to claim 2, wherein
   an incident angle of the incident light from said light source is smaller than a critical angle on a boundary surface between said transparent body and said surface film layer and larger than a critical angle on a boundary surface between said transparent body and said fluid layer.

4. A device according to claim 3, wherein
   when the second refractive index is lower than the first refractive index, the difference between the first and second refractive indices is set to be small.

5. A device according to claim 1, wherein
   said surface film layer comprises a plastic film having a thickness of 5 to 50 μm.

6. A device according to claim 5, wherein
   said plastic film has a thickness of 10 to 30 μm.

7. A device according to claim 1, wherein
   said fluid layer essentially consists of a material having a kinematic viscosity of not more than 5,000 mm$^2$/s at room temperature.

8. A device according to claim 7, wherein
   said fluid layer consists of a material having a kinematic viscosity of not more than 1,000 mm$^2$/s at room temperature.

9. A fingerprint detecting method comprising:
   transferring a three-dimensional pattern of a skin surface of a finger pressed against a surface of a transparent body from the skin surface to a thin surface film layer formed on said surface of said transparent body;
   bringing said surface film layer into contact with said surface of said transparent body through a fluid layer sealed between said surface film layer and said surface of said transparent body, in accordance with the three-dimensional pattern of said skin surface transferred to said surface film layer;
   irradiating incident light from an inside of said transparent body on said skin surface pressed against said surface of said transparent body; and
   when said surface film layer comes into contact with said surface of said transparent body in correspondence with the three-dimensional pattern of said skin surface, detecting, as an image fingerprint pattern, a change in reflected light due to reflection of the incident light in areas where said fluid layer contacts said surface of said transparent body and absorption of incident light in areas where said surface film layer contacts said surface of said transparent body, said change occurring due to a difference between refractive indices of said transparent body, said surface film layer, and said fluid layer.

10. A fingerprint detecting device comprising:
    a transparent body having a surface;
    a light source for irradiating incident light from an inside of said transparent body on said surface of said transparent body;
    a thin surface film layer attached to said surface of said transparent body and adapted to contact said surface of said transparent body at ridge portions of a finger pressed against said surface film layer, said surface film layer passing the incident light from said light source in areas where said surface film layer contacts said surface of said transparent body;
    a liquid layer sealed between said surface of said transparent body and said surface film layer, said liquid of said liquid layer totally reflecting the incident light from said light source in areas where said liquid layer contacts said surface of said transparent body; and
    an image detection unit that detects an image fingerprint pattern on the basis of light from said light source that is reflected by said surface of said transparent body.

* * * * *